March 17, 1936.  R. L. ADAMS  2,034,550
ARCING TIP AND METHOD FOR MAKING THE SAME.
Filed Oct. 25, 1934  2 Sheets-Sheet 1

Inventor:
Roy L. Adams,
by Harry E. Dunham
His Attorney.

March 17, 1936.  R. L. ADAMS  2,034,550
ARCING TIP AND METHOD FOR MAKING THE SAME
Filed Oct. 25, 1934  2 Sheets-Sheet 2

Inventor:
Roy L. Adams,
by Harry E. Dunham
His Attorney.

Patented Mar. 17, 1936

2,034,550

UNITED STATES PATENT OFFICE 2,034,550

ARCING TIP AND METHOD FOR MAKING THE SAME

Roy L. Adams, Schenectady, N. Y., assignor to General Electric Company, a corporation of New York Application October 25, 1934, Serial No. 750,027

9 Claims. (Cl. 200—166)

The present invention relates to electrical contacts and more particularly to arcing tips for use in oil circuit breakers and the like.

One of the objects of the present invention is to provide an efficient low cost arcing tip which has a long life and is free from soldered joints. It is a further object of the invention to provide a simple method for manufacturing such tips.

Heretofore arcing tips generally have been formed by silver soldering a copper slug to two shaped pieces of tungsten impregnated with copper. The shaped pieces are soldered together at their end portions and form the contact surface of the arcing tip.

In the manufacture of such tips powdered tungsten is pressed into similar slabs of desired shape which are then impregnated with molten copper in a manner well known in the art. The impregnated slabs are machined on all sides and rounded at their outer ends so as to provide a substantially continuous contact surface when mounted on the end of the copper slug. The copper slug is machined to fit closely against the inner surface of the slabs and to form a continuation of the outer surfaces of the impregnated slabs when silver soldered thereto. The manufacture of contacts of the above type is quite expensive owing to the large number of shaping, machining and soldering operations.

In accordance with the present invention the arcing tip consists of a copper slug or supporting member which is formed by melting copper or like metal on to a contact portion which consists of a one-piece U-shaped member made of tungsten and impregnated with copper or other metal of high electrical conductivity. This process involves no brazing or soldering operations and requires but one final machining operation.

Figure 1:
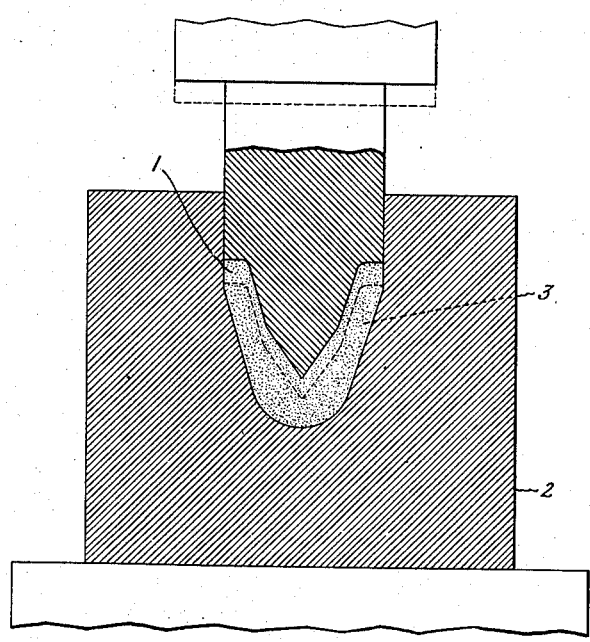
Figure 2:
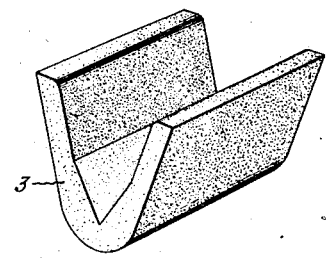
Figure 3:
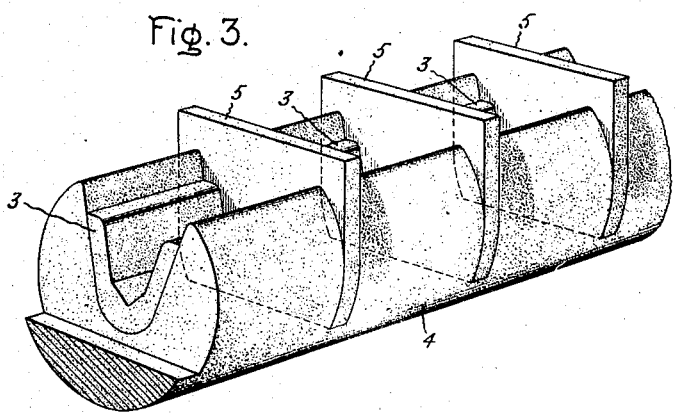
Figure 4:
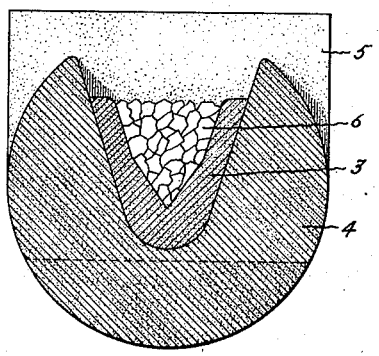
Figure 5:
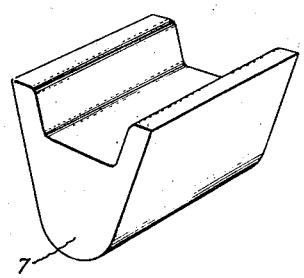
Figure 6:
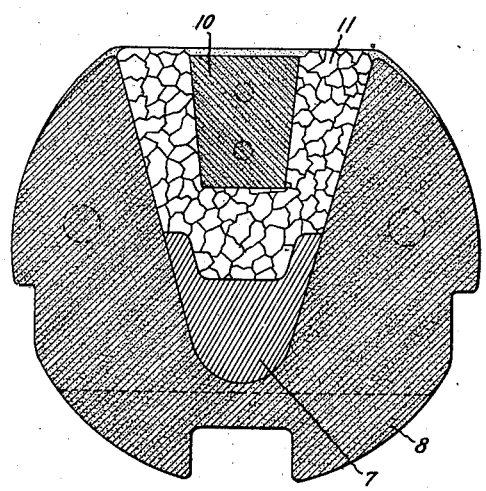
Figure 7:
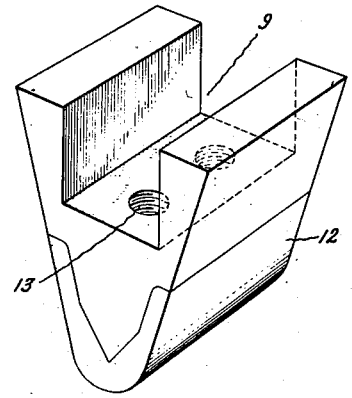

The novel features which are characteristic of the present invention are set forth with particularity in the appended claims. The invention however will best be understood from reference to the following specification when considered in connection with the accompanying drawings in which Fig. 1 is a cross-sectional view of a mold and plunger for shaping powdered metal employed in the fabrication of my improved arcing tip; Fig. 2 is a perspective view of the cold pressed metal tip produced in the mold disclosed in Fig. 1; Fig. 3 is a perspective view of a portion of a carbon boat with cold pressed metal pieces positioned therein; Fig. 4 is a cross-sectional view on an enlarged scale of the apparatus shown in Fig. 3, the cold pressed metal pieces being filled with scrap copper for impregnation therewith; Fig. 5 is a perspective view of the cold pressed metal after impregnation with copper; Fig. 6 is a cross-sectional view of a carbon boat and illustrates the manner in which a copper body or slug may be secured to the impregnated arcing tip, while Fig. 7 is a perspective view of the completed arcing tip.

In carrying out the present invention a desired quantity of powdered tungsten 1 is pressed cold under slight pressure in a mold 2 to form a substantially U-shaped metal piece 3, as indicated in Fig. 2 of the drawings. A plurality of pressed pieces similar to piece 3 are then placed in a carbon boat 4 and separated by partitions 5, as indicated in Fig. 3. Pieces of scrap copper 6 are placed within the pressed pieces 3, as indicated in Fig. 4 of the drawings and the loaded carbon boat placed in a hydrogen furnace and the copper melted thereby thoroughly impregnating the pressed metal pieces 3. The tip 7 thus formed contains an amount of copper in excess of that required merely to impregnate the pressed metal as clearly indicated in Fig. 5.

A plurality of tips thus formed, for convenience usually about six, are then placed in contact with one another and in alignment in a carbon boat 8. If it is desired to form a slot 9 in the upper end of the arcing tip, a graphite bar 10 may be positioned in the boat 8 above the shaped impregnated pieces 7 as indicated in Fig. 6. The boat is then filled with scrap copper 11, as indicated in Fig. 6, and the loaded boat placed in a hydrogen furnace and the copper melted. The molten copper penetrates into the tungsten impregnated pieces 7 and between the adjacent pieces forming one long integral arcing tip entirely free from soldered joints or the like.

The long arcing tip thus formed is machined to provide it with a suitable finish and to remove excess copper from the lower portion thereof. Faint lines indicate the junction between the several tips employed in the fabrication of the single tip and the tip is cut along these lines to provide for example six arcing tips 12, as indicated in Fig. 7. The tips thus formed may be provided with screw-threaded openings 13 for attachment to any suitable supporting means.

What I claim as new and desire to secure by Letters Patent of the United States, is:

1. The method of making an arcing tip which comprises pressing powdered tungsten into a U-shaped member, impregnating the shaped member with copper and applying molten copper to said impregnated member to provide a support therefor.

2. The method of making an arcing tip which comprises pressing tungsten into a desired shape, impregnating the shaped member with an excess of copper and applying molten copper to said impregnated member to provide a support therefor.

3. The method of making an arcing tip which comprises pressing a refractory metal into a desired shape, impregnating the shaped member with a metal of high electrical conductivity and applying molten metal of high electrical conductivity to said impregnated member to provide a support therefor.

4. The method of making arcing tips which comprises pressing powdered tungsten into a plurality of similarly shaped pieces, impregnating said shaped pieces with an excess of copper, placing said impregnated pieces in alignment in a carbon boat, filling said boat to a desired extent with copper and melting said copper to thereby provide a support for said impregnated pieces.

5. The method of making an arcing tip which comprises applying molten metal of high electrical conductivity to a shaped metal piece consisting substantially of tungsten and copper to provide a support therefor.

6. An arcing tip consisting of a U-shaped contact member and a body portion, said contact member consisting substantially of tungsten and copper, said body portion being formed by applying molten copper to said contact member.

7. An arcing tip comprising a contact portion and a supporting portion therefor, said contact portion comprising a one-piece U-shaped member consisting of tungsten particles impregnated with copper, said supporting member consisting substantially of pure copper cast on to said contact portion, said arcing tip being free from brazed or soldered joints.

8. An arcing tip comprising a one-piece contact portion and a supporting portion integrally joined thereto, said tip being free from brazed or soldered joints, said contact portion consisting substantially of tungsten and copper.

9. The method of making an arcing tip consisting of a body portion and a contact portion which comprises pressing powdered tungsten into a U-shaped member, applying sufficient molten copper to said shaped tungsten member to impregnate the pores thereof and provide a body portion of substantially pure copper integral with said shaped member, and machining said arcing tip to remove excess copper from the surface of said contact member.

ROY L. ADAMS.